(12) United States Patent
Brown

(10) Patent No.: US 9,035,082 B2
(45) Date of Patent: May 19, 2015

(54) LOW SURFACE ENERGY TOUCH SCREENS, COATINGS, AND METHODS

(75) Inventor: James F. Brown, Clifton, VA (US)

(73) Assignee: Cytonix, LLC, Beltsville, MD (US)

( * ) Notice: Subject to any disclaimer, the term of this patent is extended or adjusted under 35 U.S.C. 154(b) by 0 days.

(21) Appl. No.: 13/544,360

(22) Filed: Jul. 9, 2012

(65) Prior Publication Data
US 2013/0177737 A1 Jul. 11, 2013

Related U.S. Application Data

(60) Provisional application No. 61/545,556, filed on Oct. 10, 2011.

(51) Int. Cl.
| C07F 7/02 | (2006.01) |
| D06N 7/04 | (2006.01) |
| C09D 171/00 | (2006.01) |
| C08G 65/00 | (2006.01) |
| C08G 65/336 | (2006.01) |

(52) U.S. Cl.
CPC .............. *C09D 171/00* (2013.01); *C08G 65/00* (2013.01); *Y10T 428/24612* (2015.01); *Y10T 428/24355* (2015.01); *C08G 65/005* (2013.01); *C08G 65/336* (2013.01); *C08G 2650/48* (2013.01)

(58) Field of Classification Search
CPC ...... C09D 171/00; C08G 65/00; C08G 67/02; C08G 73/0616; C07F 7/1836
USPC .............................. 556/400; 428/141; 524/261
See application file for complete search history.

(56) References Cited

U.S. PATENT DOCUMENTS

| 4,861,667 A | 8/1989 | Takayanagi et al. |
| 6,270,903 B1 | 8/2001 | Feng et al. |
| 6,447,919 B1 | 9/2002 | Brown et al. |
| 7,097,910 B2 | 8/2006 | Moore et al. |
| 7,655,310 B2 | 2/2010 | Trombetta |
| 7,803,894 B2 | 9/2010 | Dams et al. |
| 7,824,043 B2 | 11/2010 | Hatano et al. |
| 7,871,675 B2 | 1/2011 | Stanjek et al. |
| 2001/0019773 A1 | 9/2001 | Akamatsu et al. |
| 2003/0124361 A1 | 7/2003 | Moore et al. |
| 2003/0138643 A1 | 7/2003 | Moore et al. |
| 2003/0139620 A1 | 7/2003 | Yamaguchi et al. |
| 2004/0091720 A1 | 5/2004 | Moore et al. |
| 2004/0092675 A1 | 5/2004 | Moore et al. |
| 2006/0110537 A1 | 5/2006 | Huang et al. |
| 2008/0220264 A1 | 9/2008 | Iyer et al. |
| 2009/0197048 A1 | 8/2009 | Amin et al. |
| 2009/0326146 A1 | 12/2009 | Sepeur et al. |
| 2010/0015344 A1 | 1/2010 | Groenewolt et al. |
| 2010/0053547 A1 | 3/2010 | Baude et al. |
| 2010/0239823 A1 | 9/2010 | Tho et al. |
| 2010/0272910 A1* | 10/2010 | Kishita et al. ................. 427/387 |
| 2010/0285275 A1 | 11/2010 | Baca et al. |
| 2010/0304086 A1 | 12/2010 | Carre et al. |
| 2010/0324205 A1 | 12/2010 | Maier et al. |
| 2011/0003098 A1 | 1/2011 | Wen et al. |

FOREIGN PATENT DOCUMENTS

| WO | WO 2010060006 A1 * | 5/2010 |
| WO | WO 2011060047 A1 * | 5/2011 |

OTHER PUBLICATIONS

Sabia et al., Corning Gorilla (R) Glass, Corning Incorporated, Science amd Technology Division (Nov. 2010).

* cited by examiner

*Primary Examiner* — Porfirio Nazario Gonzalez
*Assistant Examiner* — Kofi Adzamli
(74) *Attorney, Agent, or Firm* — Kilyk & Bowersox, P.L.L.C.

(57) ABSTRACT

Substrates, surfaces, assemblies, kits, compositions, and methods are provided for forming touch screens and other appliance surfaces exhibiting good hydrophobicity, oleophobicity, and abrasion resistance. Methods are provided for increasing a population density of hydroxyl groups on a touch surface of a touch screen substrate without affecting the compressive strength of the back surface. The treated touch surface of the substrate can then be coated with a coating that includes an organo-metallic and/or silane, for example, a fluorosilane such as a perfluoropolyether alkoxysilane. A substrate can retain its compressive resistance to breakage by impact applied to the touch surface while minimizing any decrease in compressive strength against impact against the touch surface. Examples of such substrates include touch screens for mobile and desktop electronic devices, components of 3D display devices, and components for electrowetting display devices.

24 Claims, 5 Drawing Sheets

LOW SURFACE ENERGY TOUCH SCREENS, COATINGS, AND METHODS

CROSS REFERENCE TO RELATED APPLICATION

The present application claims priority to U.S. Provisional Patent Application No. 61/545,556 filed Oct. 10, 2011, which is incorporated herein in its entirety by reference.

FIELD

The present teachings relate to substrate coatings that increase hydrophobicity, oleophobicity, and abrasion resistance.

BACKGROUND

The explosive growth of both portable and desktop touch screen devices has meant a heightened need to keep such surfaces clean. Use of a touch screen device, by name, involves touching by a user's fingers. Any oils, moisture, or various other materials found on one's fingertips can be transferred to the surface of a touch screen device. Overtime, these materials can accumulate and deleteriously affect the functionality, viewability, and general appearance of the device. Existing coating compositions and/or methods have proved unsatisfactory in terms of cost, efficient use of materials, longevity and/or the ability to resist abrasion, water, cleaning agents and lipids.

Glass hardening has been used to strengthen touch screen substrates against breakage, scratching and abrasion. Conventional hardening techniques, however, result in glass surfaces having reduced population densities of hydroxyl groups that could be used for bonding with an organo-metallic and/or silane coating material. Treating substrates to increase hydroxyl group population densities destroys or removes surface-compression elements, such as large atoms or ions, and strength gains from pre-hardening procedures are lost. Accordingly, there exists a need for better pre-hardened glass substrates for touch screens, and for coating methods and compositions for forming touch screen surfaces.

SUMMARY

According to various embodiments of the present teachings, a pre-hardened glass substrate is provided that comprises a treated front surface having a first exposed hydroxyl population density and a back surface having a second exposed hydroxyl population density, wherein the first exposed hydroxyl population density is greater than the second exposed hydroxyl population density. The pre-hardened glass substrate can retain atoms or ions, such as potassium, hardened into the back surface while providing a touch surface that can be optimally coated with an organo-metallic and/or silane-containing coating material. The coating material may also comprise metals, metal compounds, other elements or their compounds, and combinations thereof. As a result, a touch screen can be formed from the pre-hardened glass substrate, which has a touch surface that exhibits improved longevity, wear resistance, lubricity, oleophobicity, and hydrophobicity, without sacrificing the benefits endured to the back surface from a glass hardening procedure. Compressive strength gains from a pre-hardening procedure are not destroyed on the back surface while the touch surface provides an increased population density of reactive sites for organo-metallic and/or silane treatment. Methods and compositions for treating such pre-hardened glass substrates, for further treating such substrates with organo-metallic compounds, co-agents and silanes are also provided. In other embodiments, surface groups naturally present or absent on various substrates may be increased or added in addition to hydroxyl groups.

According to various embodiments, methods more generally for treating substrates, pre-hardened substrates, flexible substrates, rigid substrates, polymeric substrate, glass substrates, metallic substrates, inorganic substrates, and the like, are provided.

According to various embodiments of the present teachings, an assembly for quantitatively treating a surface is provided. The assembly can comprise a first adhesive surface having a first area. The assembly can comprise a second surface having a second area, facing and spaced substantially uniformly apart by a distance from the first adhesive surface. The second surface may be adhesive or non-adhesive. A capillary volume can be defined by and between the first adhesive surface and the second surface. A first fluid can be loaded into the capillary. The first fluid can comprise a chemical composition or molecule having a number of adhesion functional groups. The functional groups, when disposed as a monolayer, can make up a third area substantially equal to a first fraction of the first area. The fraction can be one, more than one, or less than one.

According to various embodiments of the present teachings, a method of coating substrate surface is provided. The substrate can be rigid, flexible, glass, plastic, metal, inorganic, a combination thereof, or the like. A fluid comprising molecules comprising adhesion functional groups is applied to a first adhesive substrate surface having a first area. A second substrate surface having a second area is placed on first adhesive substrate surface. The second substrate surface may be adhesive or non-adhesive. The second substrate may be non-adhesive to the adhesion functional groups, may be repellant to the adhesion functional groups, yet may have an affinity for a part of the molecule which is not adhesive. A substantially uniform layer of the fluid can then be formed between and in contact with the first adhesive substrate surface and the second substrate surface. The molecules can then be caused to adhere to the first and/or second substrate surfaces. The amount of the molecules comprising adhesion functional groups that can be applied can be such that, when disposed in a monolayer, the adhesion functional groups have a third area substantially equal to a fraction of the first and second areas. The fraction can be one, more than one, or less than one. The first and second substrate surfaces can then be separated after a period of time.

According to various embodiments of the present teachings, a method of manufacturing a treated substrate is provided. A substrate can be provided having a first surface comprising exposed hydroxyl groups and a second surface comprising exposed hydroxyl groups. The substrate can be rigid, flexible, glass, plastic, metallic, inorganic, a combination thereof, or the like. The first surface can be treated to increase the population density of exposed hydroxyl groups and form a treated surface, without treating the second surface. The method can provide a higher population density of exposed hydroxyl groups on the first surface than on the second surface, wherein the treated substrate retains its resistance to breakage by impact or pressure applied to the first surface because surface-compressive elements in the second surface have not been removed or destroyed.

According to various embodiments of the present teachings, a method of treating a substrate comprising a surface having exposed hydroxyl groups is provided. The method can comprise contacting a surface with a composition comprising components A and B combined together, a composition comprising A followed by a composition comprising B, or a composition comprising B followed by a composition comprising A, wherein component A is at least one fluorochemical polyether alkoxy or chloro organo-metallic and/or silane compound of formula (1):

wherein $R_f$ represents a polyfluoropolyether segment, Q represents an organic divalent linking group, $R^1$ represents a $C_1$-$C_8$ alkyl group, Y represents a hydrolysable group independently selected from a chloro group, an alkoxy group, an acyloxy group, and an aryloxy group, each R independently represents hydrogen or an alkyl group of 1 to 4 carbon atoms, z is 2, 3, or 4, and each x is independently 0 or 1. Component B can comprise tetraalkoxysilane, in an amount of 8% by weight or less based on the total weight of components A and B, when combined together. In other embodiments, Component B can be a metal or element comprising 3 or more hydrolyzable groups, for example, a tetraalkoxysilane, and may further comprise any suitable additives. The composition can further comprise forming a coating from the composition on the surface by causing components A and B to undergo a substantially complete condensation reaction.

According to various embodiments of the present teachings, a composition comprising the reaction product obtained after a substantially complete condensation reaction of components A and B is provided. Component A can comprise at least one fluorochemical polyether alkoxy or chloro organo-metallic and/or silane compound of formula (1):

wherein $R_f$ represents a polyfluoropolyether segment, Q represents an organic divalent linking group, $R^1$ represents a $C_1$-$C_8$ alkyl group, Y represents a hydrolysable group independently selected from a chloro group, an alkoxy group, an acyloxy group, and an aryloxy group, each R independently represents hydrogen or an alkyl group of 1 to 4 carbon atoms, z is 2, 3, or 4, and each x is independently 0 or 1. Component B can comprise a tetraalkoxysilane in an amount of 8% by weight or less based on the total weight of components A and B, when combined together. In other embodiments, Component B can be a metal or element comprising 3 or more hydrolyzable groups, for example, a tetraalkoxysilane, and may further comprise any suitable additives, such as additives comprising a reactive functionality.

According to various embodiments of the present teachings, a kit equipped for substrate coating is provided comprising a first container and a second container packaged in a third container. The first container can comprise at least one fluorochemical polyether alkoxy or chloro organo-metallic and/or silane compound of the formula (1):

wherein $R_f$ represents a polyfluoropolyether segment, Q represents an organic divalent linking group, $R^1$ represents a $C_1$-$C_8$ alkyl group, Y represents a hydrolyzable group independently selected from a chloro group, an alkoxy group, an acyloxy group, and an aryloxy group, each R independently represents hydrogen or an alkyl group of 1 to 4 carbon atoms, z is 2, 3, or 4, and each x is independently 0 or 1. A second container comprises a tetraalkoxysilane and/or one or more metals or elements comprising hydrolyzable groups, and may further comprise any suitable additives. In some embodiments, the amount of tetraalkoxysilane can be 8% by weight or less based on the total weight of the combined contents of the first container and second container.

The present teachings also provide a touch screen that exhibits a water contact angle of 100° or more after 3000 double rubs with 0000 steel wool at a pressure of 2.5 grams per square millimeter.

BRIEF DESCRIPTION OF THE DRAWINGS

A better understanding of the features and advantages of the present disclosure will be obtained by reference to the accompanying drawings, which are intended to illustrate, not limit, the present teachings.

DETAILED DESCRIPTION OF THE DISCLOSURE

Figure 1:
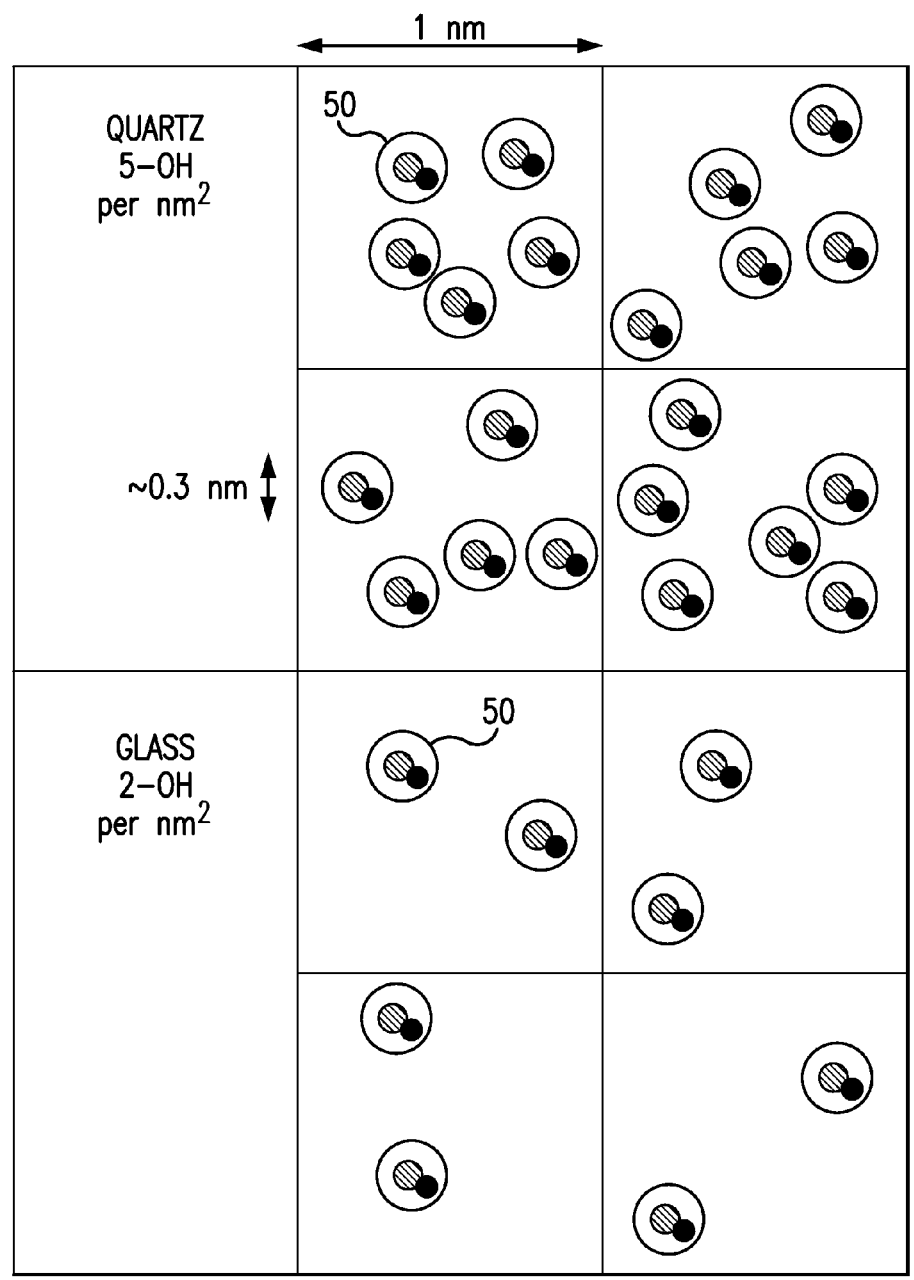
FIG. 1 is a schematic representation of substrate surfaces comprising free hydroxyl groups in accordance with various embodiments of the present teachings and comparing the population density of hydroxyl groups to the density on a glass surface.

According to various embodiments of the present teachings, a perfluoropolyether silane is provided, of the formula:

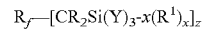

wherein $R_f$ represents a pendant polyfluoropolyether, $R^1$ represents a $C_1$-$C_8$ alkyl group, Y represents a hydrolysable group independently selected from a chloro group, an alkoxy group, an acyloxy group, and an aryloxy group, each R independently represents hydrogen or an alkyl group of 1 to 4 carbon atoms, z is 2, 3, or 4, and each x is independently 0 or 1. The pendant perfluoropolyether can be any type of perfluoropolyether, for example, a K type or Y type perfluoropolyether. The pendant perfluoropolyether can have a molecular weight of from about 500 to about 10,000 amu, for example, from about 2000 to about 5000 amu. The hydrolysable group can comprise a chloro group, a methoxy group, an ethoxy group, a combination thereof, or the like. A composition comprising the perfluoropolyether silane and one or more additives is also provided. The additives can comprise, for example, a tetraalkoxy silane, a polysilane, a polyorganometallic compound, a dipodal silane, a dipodal organometallic compound, a combination thereof, and the like. The composition can instead, or additionally, comprise a fluorinated solvent as an additive. According to various embodiments, articles, for example, display devices, can be coated with the perfluoropolyether silane. In some cases, the article can comprise a smooth surface that is coated, at least in part, by the perfluoropolyether silane. In some cases, the article can comprise a rough surface that is coated, at least in part, by the perfluoropolyether silane, and the rough surface can have a repeating or random topography, a relief, an impression, a texture, a pattern, a design, a feature, a combination thereof, or the like. The article can comprise a touch screen that is coated, at least in part, by the perfluoropolyether silane, or a 3D imaging screen that is coated, at least in part, by the perfluoropolyether silane, or an electrowetting display screen that is coated, at least in part, by the perfluoropolyether silane.

According to various embodiments of the present teachings, a perfluoropolyether silane is provided of the formula:

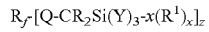

$$R_f\text{-}[Q\text{-}CR_2Si(Y)_{3\text{-}x}(R^1)_x]_z$$

wherein $R_f$ represents a pendant polyfluoropolyether, Q represents a divalent linking group, $R^1$ represents a $C_1$-$C_8$ alkyl group, Y represents a hydrolysable group independently selected from a chloro group, an alkoxy group, an acyloxy group, and an aryloxy group, each R independently represents hydrogen or an alkyl group of 1 to 4 carbon atoms, z is 2, 3, or 4, and each x is independently 0 or 1. The pendant perfluoropolyether can be any type of perfluoropolyether, for example, a K type or Y type perfluoropolyether. The pendant perfluoropolyether can have a molecular weight of from about 500 to about 10,000 amu, for example, from about 2000 and about 5000 amu. The hydrolysable group can comprise a chloro group, a methoxy group, an ethoxy group, a combination thereof, or the like. A composition comprising the perfluoropolyether silane and one or more additives is also provided. The additives can comprise, for example, a tetraalkoxy silane, a polysilane, a polyorganometallic compound, a dipodal silane, a dipodal organometallic compound, a combination thereof, and the like. The composition can instead, or additionally, comprise a fluorinated solvent as an additive. In some cases, the perfluoropolyether silane can comprise the reaction product of a pendant perfluoropolyether vinyl ether and $Cl_3SiH$. The methods can comprise reacting a pendant perfluoropolyether vinyl ether and $Cl_3SiH$ together. In some cases, the perfluoropolyether silane comprises the reaction product of a pendant perfluoropolyether trichlorosilane and one or more alcohols selected from methanol, ethanol, and propanol, and the methods herein can comprise reacting these reactants together. According to various embodiments, articles, for example, display devices, can be coated with the perfluoropolyether silane. In some cases, the article can comprise a smooth surface that is coated, at least in part, by the perfluoropolyether silane. In some cases, the article can comprise a rough surface that is coated, at least in part, by the perfluoropolyether silane, and the rough surface can have a repeating or random topography, a relief, an impression, a texture, a pattern, a design, a feature, a combination thereof, or the like. The article can comprise a touch screen that is coated, at least in part, by the perfluoropolyether silane, or a 3D imaging screen that is coated, at least in part, by the perfluoropolyether silane, or an electrowetting display screen that is coated, at least in part, by the perfluoropolyether silane.

According to various embodiments of the present teachings, a perfluoropolyether silane is provided of the formula:

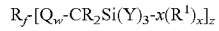

$$R_f\text{-}[Q_w\text{-}CR_2Si(Y)_{3\text{-}x}(R^1)_x]_z$$

wherein $R_f$ represents a K or Y type perfluoropolyether, Q represents a divalent linking group, $R^1$ represents a $C_1$-$C_8$ alkyl group, Y represents a hydrolysable group independently selected from a chloro group, an alkoxy group, an acyloxy group, and an aryloxy group, each R independently represents hydrogen or an alkyl group of 1 to 4 carbon atoms, z is 1, 2, 3, or 4, w is 0 or 1, and each x is independently 0 or 1.

According to various embodiments of the present teachings, a pre-hardened glass substrate is provided that comprises a first surface having a first exposed hydroxyl population density and a post-treated second surface having a second exposed hydroxyl population density. The first exposed hydroxyl population density can be less than the second exposed hydroxyl population density and the second surface can be coated to form a touch surface. The pre-hardened glass substrate can retain its compressive resistance to breakage by impact or pressure applied to the second surface while minimizing any decrease in tensile strength of the first surface.

The second exposed hydroxyl population density can have a range of densities, for example, from about 2.0 to about 5.0, from about 2.0 to about 2.5, or about 2.2 hydroxyl groups per square nanometer. In some embodiments, the second exposed hydroxyl population density has a density greater than about 2.2 hydroxyl groups per square nanometer. In some embodiments, the first exposed hydroxyl population density is less than about 1.8 hydroxyl groups per square nanometer. The second exposed hydroxyl population density can be greater than the first exposed hydroxyl population density by about 0.1 to about 3.2, from about 0.25 to about 2.5, or about 0.4 hydroxyl groups per square nanometer. According to the present teachings, the second exposed hydroxyl population density can be equivalent to the amount of a first organo-metallic and/or silane that will be used to coat the surface, such that each first organo-metallic and/or silane molecule will substantially only attach to a single hydroxyl group and not to a neighboring organo-metallic and/or silane. Such stoichiometry forms a coating that is not a two-dimensional network of molecules. Adjacent first organo-metallic and/or silanes, once bonded to the surface, can be crosslinked to one another simultaneously or subsequently by a second organo-metallic and/or silane. The second organo-metallic and/or silane can be the same as the first.

The post-treated second surface can have been treated by any suitable process to selectively increase the second exposed hydroxyl population density. In some embodiments, the process to selectively increase the second exposed hydroxyl population density comprises a plasma process, including a plasma jet process, or an abrasive precess. The process to selectively increase the second exposed hydroxyl population density can comprise exposure to steam, ammonia, hydrogen peroxide, an acid, a base, fluorine, a halogen compound, an oxidizing agent, a reducing agent, or a combination thereof. In some examples, the touch surface can be treated to increase the hydroxyl group population density by contacting the touch surface with a solution comprising from about 3% by volume to about 30% by volume ammonium hydroxide, from about 3% by volume to about 30% by volume hydrogen peroxide, and from about 40% by volume to about 94% by volume water. Another exemplary treating solution that can be used comprises from about 3% by volume to about 30% by volume concentrated sulfuric acid, from about 3% by volume to about 30% by volume hydrogen peroxide, and from about 40% by volume to about 94% by volume water. Another exemplary treating solution that can be used comprises from about 0.1% by weight to about 10% by weight ammonium bifluoride, and from about 90% by weight to about 99% by weight water. Dilute solutions of aqueous hydrofluoric acid are also preferred, as are concentrated solutions of sodium hydroxide. In other embodiments, surface groups naturally present or absent on various substrates may be increased or added, in addition to hydroxyl groups, by the present teachings.

After treating to increase hydroxyl group population density, the post-treated second surface can be reacted with a touch screen coating composition. In some embodiments, the post-treated second surface can be reacted with a first organo-metallic and/or silane, for example, a monoorgano-metallic and/or monosilane, a diorgano-metallic and/or disilane, a tri-organo-metallic and/or trisilane, a tetraorgano-metallic and/ or tetrasilane, a polyorgano-metallic and/or polysilane, or a combination thereof, each comprising one, two, three, four or poly hydrolysable groups, respectively. For purposes of the present teachings, chlorine will be considered a hydrolysable group. Silane and other organo-metallic groups can form from one to about four hydrolyzable linkages, by way of example, a disilane can have from 2 to about 6 linkages, and a tetrasilane can have from 4 to about 12 hydrolyzable linkages. In some embodiments, the post-treated second surface can be reacted with at least a second organo-metallic and/or silane. The first organo-metallic and/or silane and/or the second organo-metallic and/or silane can comprise a fluorinated organo-metallic and/or silane, for example, a perfluorinated organo-metallic and/or silane. The organo-metallic and/or silane can be applied in the presence of an anhydride. In some embodiments, the anhydride can comprise a fluorinated anhydride. The fluorinated organo-metallic and/or silane can comprise a perfluoropolyether. The fluorinated organo-metallic and/or silane can comprise a polyorgano-metallic and/or silane comprising two or more organo-metallic and/or silane groups. In some embodiments, the post-treated second surface is substantially covered by a layer of a fluorinated solution, for example, containing an amount of organo-metallic and/or silane sufficient to form a monomolecular layer or more of organo-metallic and/or silane.

The post-treated second surface, or touch surface, can be reacted with any suitable number of organo-metallic and/or silane groups per square nanometer to form single or multiple layers. A continuous monolayer of organo-metallic and/or silane groups can be formed from about 6 to about 10 groups per square nanometer. For example, to form a monolayer, the post-treated second surface can be reacted with a quantity of first organo-metallic and/or silane groups at from about 1 group to about 2 groups, and then subsequently reacted with a quantity of second organo-metallic and/or silane groups at from about 4 groups to about 9 groups. The post-treated second surface can be exposed to a quantity of organo-metallic and/or silane groups, which, when disposed as a monolayer, would cover an area substantially equal to a fraction or multiple of the area of the second surface or a selected portion thereof. In some embodiments, the post-treated second surface has been reacted with sufficient hydrolyzable organo-metallic material, for example, tetra-hydrolyzable silicon, such as tetraethoxysilane, or a combination of organo-metallic materials to form at least one or more monolayer(s) of silicate or silicate composite, and simultaneously or secondarily exposed to a quantity of second organo-metallic and/or silane molecules, which, when disposed as a monolayer, would cover an area substantially equal to the area of the second surface or a selected portion thereof. The quantity of first organo-metallic and/or silane molecules and/or quantity of second organo-metallic and/or silane molecules can comprise perfluoropolyether organo-metallics and/or silanes. The perfluoropolyether organo-metallic and/or silanes can have a molecular weight of between from about 500 and about 10,000. In some embodiments, the quantity of a first organo-metallic and/or silane is about 2 molecules per square nanometer, and the quantity of a second organo-metallic and/or silane is from about 2 to about 7 molecules per square nanometer. The post-treated second surface can be first reacted with a quantity of organo-metallic and/or silane groups of a poly-organo-metallic and/or silane having organo-metallic and/or silane functional adhesive groups substantially equalling the number of hydroxyl groups on the second surface, and then secondarily exposed to a quantity of second organo-metallic and/or silane molecules, comprising monofunctional organo-metallics and/or silanes, which, when disposed as a monolayer, would cover an area substantially equal to a remaining area of the second surface. In other embodiments, the second fluid may comprise adhesive functional groups that are different from the first adhesive functional groups, and the molecules comprised in the first or previous fluid may comprise functional groups which would be selectively adhesive to molecules comprising the second or previous fluid. Such a combination of differing functional groups may be drawn from any of the reactive chemical groups which are well know in the art, for example, nucleic acid base pairs, enzymes, epoxies, amines, alcohols, isocyanates, vinyls, or (meth)acrylics, to name a few. In some embodiments, the second or subsequent molecules may be crosslinked by additional functional adhesive groups or adhesive pairs of groups drawn from a similar list.

The post-treated second surface can be a hydrophobic and/or oleophobic surface useful as a touch surface for a touch-controlled electronic device. In some embodiments, the touch-controlled electronic device further comprises a mechanism for polarizing or directing light to produce 3D images. In various embodiments, the coated surface may be part of an article or an appliance, such as a display device.

According to various embodiments of the present teachings, an assembly for quantitatively treating a surface is provided. The assembly can comprise a first surface having a first area. The assembly can comprise a second surface having a second area, facing and spaced substantially uniformly apart from the first surface, by a distance. The first surface, the second surface, or both surfaces may be adhesive to an adhesion functional group. The first and second surfaces may be positioned together such that a capillary volume can be defined by and between the first surface and the second surface. The assembly can comprise a first fluid within the capillary volume, for example, to fill the capillary volume. The fluid may be dispensed onto the first or second substrate prior to positioning the surfaces to form the capillary, or the fluid may be loaded into the volume after the surfaces are positioned to form the capillary. The fluid can comprise a chemical composition or molecule having a number of adhesion functional groups. The adhesion groups, when disposed as a monolayer, can be of sufficient area to cover a third area that is substantially equal to a first fraction of the first area. The adhesive functional groups may be activated by the presence or absence of a substance, a polarizing electric field, electromagnetic excitation, heat, or combinations thereof.

The adhesive properties of the first adhesive surface and the second surface can vary or be the same. In some embodiments, the second surface is not adhesive to the adhesion functional group. In some embodiments, the second surface is not adhesive to the adhesion functional group and further comprises means or devices for introducing the fluids. In some embodiments, the second surface is not adhesive to the adhesion functional group and comprises a flexible film or sheet. In some embodiments, where the second surface is not adhesive to the adhesion functional group, the second surface may be porous to atoms or molecules, allowing transport into and out of the capillary volume, for example, to molecules of water or a catalyst. In some embodiments, the second surface is adhesive to the adhesive functional group, the first and second areas are essentially equal, and the third area is equal to a first fraction of the combined first and second areas. The first fraction can be any suitable fraction of the first area, for example, the first fraction can be from about 1/8 to about 10/8, or from about 1/5 and about 12/10 of the first area. In some embodiments, the first fraction is less than or equal to about 1. In some embodiments the first fraction can be a multiple of about 1. In some embodiments, the first fraction can be substantially greater than one. The assembly can comprise a device for introducing and/or withdrawing the first fluid and/or any additional fluid. The capillary can comprise one or more spacers. The spacers may be free in the fluid, introduced between the surfaces, or attached to one or both of the first and second surfaces. The spacers may be solid, liquid or gas, or a combination thereof. The first and second surfaces may be spaced substantially uniformly apart because of a balance between capillary forces and the fluid viscosity or a balance between gravity and electromagnetic forces. The first and/or second adhesive surface can comprise glass, and the adhesion functional group can be any chemically reactive group well know in the art, for example an organo-metallic group, such as a silane group, or a combinations thereof. The chemical composition or molecule can comprise a perfluoropolyether. The distance between the first adhesive surface and the second surface can be any appropriate distance. For example, the distance can be less than about 5 mm, less than about 1 mm, less than about 100 µm, less than about 25 µm, from about 1 mm to about 10 nm, from about 100 µm to about 25 nm, or from about 30 nm to about 100 nm.

According to various embodiments of the present teachings, a method of coating substrate surfaces is provided. A fluid comprising molecules comprising adhesion functional groups is applied to a first substrate surface having a first area. A second substrate surface having a second area is placed on the first substrate surface. A substantially uniform layer of the fluid is formed between the first and second substrate surfaces. The first substrate surface and/or the second substrate surface may be adhesive to the adhesive functional groups. The molecules are adhered or caused to adhere to the adhesive substrate surface. The molecules comprising adhesive functional groups in the fluid can have a concentration such that when the functional groups are disposed in a monolayer they have a third area substantially equal to a fraction of the first and/or second areas. The first and second substrate surfaces can then be separated after a time, whereafter a stage of an adhesion has occurred. In some embodiments, at least a second fluid having a concentration of molecules having adhesive functional groups capable of adhering to the remaining adhesive substrate surface(s) and/or to adhesive groups comprised in the first fluid is applied. In some embodiments, the adhesive functional groups of the second fluid can be the same as those of the first or a previous fluid. At least one spacer can be positioned or located between the first and second adhesive substrate surfaces. In some embodiments, the at least one spacer is attached to one or both adhesive substrate surfaces, or is present in the fluids. The method can comprise collecting one or more of the fluids for reuse. In some embodiments, at least one of the adhesive substrate surfaces is a touch screen surface, an appliance, or a display device.

According to various embodiments of the present teachings, a method of manufacturing a treated substrate is provided. A substrate can be provided having a first surface comprising exposed hydroxyl groups and a second surface comprising exposed hydroxyl groups. The first surface can be treated to increase the population density of exposed hydroxyl groups and form a treated surface without treating the second surface to increase the population density of exposed hydroxyl groups. The method can provide a higher population density of exposed hydroxyl groups on the first surface than on the second surface, wherein the treated substrate retains its compressive resistance to breakage by impact applied to the first surface while minimizing any decrease in tensile strength of the second surface. In some embodiments, the substrate used in the method comprises a glass material. A glass material can be hardened prior to the treating. In some embodiments, the glass material is embedded with one or more kinds of large atoms or ions, such as potassium ions, to place the substrate surfaces under compression, increasing resistance to breakage. In some embodiments, the glass surface is hardened by cooling the surfaces rapidly from a temperature above the Tg for the glass. The treating can comprise buffing or treating with at least one of ammonia, hydrogen peroxide, an acid, a base, bleach, fluorine, hydrofluoric acid, halogen compounds, an oxidizing agent, a reducing agent, a plasma, steam, or a combination thereof, or any of the solutions described herein or known to in the art for such purpose.

The method of manufacturing a treated substrate can further comprise applying one or more coating to the treated surface. A coating composition can be applied to the treated surface, and the coating composition can comprise a first organo-metallic and/or silane, for example an alkoxy or chloro organo-metallic and/or silane compound. In some embodiments, the first organo-metallic and/or silane compound comprises a first perfluoropolyether alkoxy or chloro organo-metallic and/or silane compound. The first perfluoropolyether organo-metallic and/or silane compound can have a molecular weight of from about 500 to about 10,000 atomic units, from about 500 to about 4,000 atomic units, from about 1000 to about 2500 atomic units, or more than about 10,000 atomic units. In some embodiments, the first organo-metallic and/or silane is a fluoroalkyl organo-metallic and/or silane. In some embodiments, a tetra-hydrolyzable organo-metallic compound, for example, tetraethoxysilane, is applied to the treated surface. In some embodiments, the tetra-hydrolyzable organo-metallic and/or silane compound is applied to the treated surface at the same time the perfluoropolyether organo-metallic and/or silane compound is applied to the treated surface, and they may be combined together prior to application to the treated surface. In some embodiments, the tetra-hydrolyzable organo-metallic is applied to the treated surface prior to applying the perfluoropolyether organo-metallic and/or silane compound to the treated surface. In some embodiments the at least first organo-metallic and/or silane may be a chloro-organo-metallic or a chlorosilane, for example, titanium tetrachloride or silicon tetrachloride. In some embodiments, organo-metallic compounds that are mono-hydrolyzable, di-hydrolyzable, or tri-hydrolyzable, that is, having one, two or three hydrolyzable linkages per atom, may be used as all or part of the first or second coating treatments. In some embodiments the at least first organo-metallic and/or silane may be a monofunctional organo-metallic and/or silane, that is an organo-metallic and/or silane having, for example, one triethoxy organo-metallic and/or silane group. In some embodiments the at least first organo-metallic and/or silane may be a di-functional organo-metallic and/or silane, that is an organo-metallic and/or silane molecule having, for example, two triethoxy organo-metallic and/or silane groups or, other embodiments, two trichloro organo-metallic and/or silane groups. The coating composition may further comprise organo-metallic compounds. In some embodiments, a tetra-hydrolyzable or tetrachloro organo-metallic and/or silane may be combined with one or more other silanes, organo-metallic compounds, organic compounds, elements, polyvalent elements, and compounds of elements. In some preferred embodiments, a hydrolyzable organo-metallic and/or silane, such as tetraethoxysilane, and any other selected ingredients, additives or co-agents may be prepared as a sol-gel before application to a surface. In some preferred embodiments, the sol-gel may include a fluorinated organo-metallic and/or silane, for example a perfluoropolyether organo-metallic and/or silane. In some embodiments, the coatings and application methods of the present teachings may be applied to surfaces which have not been treated to increase the hydroxyl population density.

The method of manufacturing the treated and/or coated substrate can further comprise installing the treated and/or coated substrate in an appliance, a touch screen, a 3D device, an electrowetting display device, a combination thereof, and the like. A treated and/or coated substrate manufactured according to the present methods is also provided. The treated and/or coated first surface of the substrate can be a hydrophobic and/or oleophobic surface, for example, useful as a touch surface for a touch-controlled electronic device.

According to various embodiments of the present teachings, a method of treating a substrate comprising a surface having exposed hydroxyl groups is provided. The method can comprise contacting a surface with a composition comprising components A and B combined together, a composition comprising A followed by a composition comprising B, or a composition comprising B followed by a composition comprising A, wherein component A is at least one fluorochemical polyether alkoxy or chloro organo-metallic and/or silane compound of formula (1)

$$R_f\text{-}[Q\text{-}CR_2Si(Y)_{3\text{-}x}(R^1)_x]_z \qquad (1)$$

wherein $R_f$ represents a polyfluoropolyether segment, Q represents an organic divalent linking group, $R^1$ represents a $C_1$-$C_8$ alkyl group, Y represents a hydrolysable group independently selected from a chloro group, an alkoxy group, an acyloxy group, and an aryloxy group, each R independently represents hydrogen or an alkyl group of 1 to 4 carbon atoms z is 2, 3, or 4, and each x is independently 0 or 1. Component B can comprise a tetraalkoxysilane in an amount of 8% by weight or less based on the total weight of components A and B, when combined together. In other embodiments, Component B can be a metal or element comprising 3 or more hydrolyzable groups, for example, tetramethoxysilane, and may further comprise any suitable additives, such as additives comprising a reactive functionality. The method can further comprise forming a coating from the composition on the surface by causing components A and B to undergo a substantially complete condensation reaction.

The method of treating a substrate can be performed by varying or keeping constant the timing of the mixing of components A and B or the individual preparation of components A and B as separate components. In some embodiments, components A and B are first mixed together before they contact the surface. In some embodiments, components A and B are mixed together and diluted in a solvent comprising a fluorosolvent to form a coating solution having a concentration of about 0.001% to about 2%, or from about 0.02% to about 0.2% by weight or less of components A and B combined, and the method comprises contacting the surface with the coating solution. In some embodiments, components A and B are mixed together and diluted in a solvent comprising a fluorosolvent to form a coating solution having a concentration of about 0.02% to about 0.05% by weight or less of components A and B combined. The fluorosolvent can comprise a fluorochlorosolvent. In some embodiments, the surface is first contacted with component B and then with component A, either or both of which may be diluted with a solvent. In some embodiments, the surface is first contacted with component A and then with component B, either or both of which may be diluted with a solvent. In some embodiments, the surface is first contacted with a diluted solution of component B in a solvent comprising a fluorosolvent and then subsequently contacted with a diluted solution of component A in a solvent comprising a fluorosolvent. In some embodiments, the surface is first contacted with a diluted solution of component A in a solvent comprising a fluorosolvent and then subsequently contacted with a diluted solution of component B in a solvent comprising a fluorosolvent. The solvent may further comprise water, organic solvents, anhydrides, initiators, catalysts, and acid or base catalysts. In some embodiments, the solvent may further comprise an fluorinated anhydride. In some embodiments, the molar amount of water may equal or exceed the molar amount of hydrolyzable groups comprised in the organo-metallic and/or silane molecule. In some embodiments, the solvent pH may be adjusted to a pH which promotes dense organo-metallic and/or silane condensation having a preferred thickness, for example, in a pH range of between about 9 and about 12 and a thickness of between about 100 nm and about 1 nm. The method of treating a substrate can be performed wherein the surface comprises exposed hydroxyl groups and the method further comprises treating the surface to increase the number of exposed hydroxyl groups before the surface is contacted with the composition. Component A can comprise a perfluoropolyether organo-metallic and/or silane having any suitable weight average molecular weight, for example from about 250 to about 10,000, from about 500 to about 5000, or from about 1,000 to about 2,500 Daltons. In some embodiments, the perfluoropolyether may be coupled to one or more chloro organo-metallic and/or silanes and/or alkoxy organo-metallic and/or silanes. The perfluoropolyether may be a pendant organo-metallic and/or silane. In some embodiments the perfluoropolyether organo-metallic and/or silane may be the silyl ether, for example, the derivative of a PFPE-Z and/or a PFPE-M perfluoropolyether. In some embodiments, the surface treated in the method comprises a touch screen surface, a 3D device, an electrowetting display device, a combination thereof, and the like.

According to various embodiments of the present teachings, a composition comprising the reaction product obtained after a substantially complete condensation reaction of components A and B is provided. Component A can comprise at least one fluorochemical polyether chloro organo-metallic and/or silane or alkoxy organo-metallic and/or silane compound of formula (1):

$$R_f\text{-}[Q\text{-}CR_2Si(Y)_{3\text{-}x}(R^1)_x]_z \qquad (1)$$

wherein $R_f$ represents a polyfluoropolyether segment, Q represents an organic divalent linking group, $R^1$ represents a $C_1$-$C_8$ alkyl group, Y represents a hydrolysable group independently selected from a chloro group, an alkoxy group, an acyloxy group, and an aryloxy group, each R independently represents hydrogen or an alkyl group of 1 to 4 carbon atoms, z is 2, 3, or 4, and each x is independently 0 or 1. Component B can comprise a tetraalkoxysilane in an amount of 8% by weight or less based on the total weight of components A and B, when combined together. In other embodiments, Component B can be a metal or element comprising 3 or more hydrolyzable groups, for example, a tetraaryloxysilane, and may further comprise any suitable additives, such as additives comprising more than one chemical or reactive functionality. In some embodiments, component B is present in an amount of from about 1% by weight to about 7% by weight based on the total weight of components A and B combined. Component A can comprise a perfluoropolyether organo-metallic and/or silane, for example an alkoxy organo-metallic and/or silane or chloro organo-metallic and/or silane, having any suitable number average molecular weight, for example from about 250 to about 10,000, from about 500 to about 5000, or from about 1,000 to about 2500 Daltons. In some embodiments, the composition is coated on a surface of a substrate as a coating, wherein the coating has a thickness of from about 2.0 to about 4.0 nanometers, or less than 4.0 nanometers. In some embodiments, the composition is coated on a surface of a substrate as a coating, wherein the coating comprises two layers, and the layer comprising component B has a thickness of from about 1 nanometer to about 100 nanometers. The coating can comprise a mono-molecular layer of the reaction product, the monomolecular layer continuous with the underlying substrate so as to constitute a monolithic surface comprising exposed fluorine compounds. In some embodiments, the composition is in the form of a coating on a touch screen surface, a 3D device, an electrowetting display device, a combination thereof, and the like. In some embodiments, the coating is substantially in the form of a monolayer.

According to various embodiments of the present teachings, a kit equipped for substrate coating is provided comprising a first container and a second container packaged in a third container. The first container comprises at least one fluorochemical polyether organo-metallic and/or silane compound of formula (1):

$$R_f-[Q-CR_2Si(Y)_{3-x}(R^1)_x]_z \quad (1)$$

wherein $R_f$ represents a polyfluoropolyether segment, Q represents an organic divalent linking group, $R^1$ represents a $C_1$-$C_8$ alkyl group, Y represents a hydrolysable group independently selected from a chloro group, an alkoxy group, an acyloxy group, and an aryloxy group, each R independently represents hydrogen or an alkyl group of 1 to 4 carbon atoms, z is 2, 3, or 4, and each x is independently 0 or 1. A second container comprises a tetraalkoxysilane, in an amount of 8% by weight or less based on the total weight of the combined contents of the first container and second container and/or a metal or element comprising 3 or more hydrolyzable groups and may further comprise any suitable additives. The contents of the first container can comprise a perfluoropolyether organo-metallic and/or silane, for example an alkoxy organo-metallic and/or silane or a chloro organo-metallic and/or silane, having any suitable number average molecular weight, for example from about 250 to about 10,000, from about 500 to about 5000, or from about 1,000 to about 2500 Daltons. In some embodiments, the contents of the second container are present in an amount of from about 0.05% by weight to about 7% by weight based on the total weight of the contents of the first and second containers.

The compositions, coatings, polymers, chemicals, solvents, substrates, surfaces, assemblies, kits, and methods as described, for example, in the following publications can be used in conjunction with various embodiments of the present teachings: U.S. Pat. No. 4,861,667; U.S. Pat. No. 6,270,903 B1; U.S. Pat. No. 6,447,919 B1; U.S. Pat. No. 6,495,624 B1; U.S. Pat. No. 6,767,587 B1; U.S. Pat. No. 7,268,179 B2; U.S. Pat. No. 7,579,056 B2; U.S. Pat. No. 7,781,027 B2; U.S. Pat. No. 7,803,894 B2; U.S. Pat. No. 7,824,043 B2; U.S. Pat. No. 7,871,675 B2; U.S. Pat. No. 7,999,013 B2; U.S. Patent Application Publication Nos. US 2001/0019773 A1; US 2003/0124361 A1; US 2003/0138643 A1; US 2003/0139620 A1; US 2004/0091720 A1; US 2004/0092675 A1; US 2006/0010537 A1; US 2008/0220264 A1; US 2009/0197048 A1; US 2009/0326146 A1; US 2010/0015344 A1; US 2010/0053547 A1; US 2010/0210769 A1; US 2010/0239823 A1; US 2010/0285275 A1; US 2010/0304086 A1; US 2010/0324205 A1; and US 2011/0003098 A1, which are incorporated herein in their entireties by reference.

With reference now to the drawings, FIG. 1 is a schematic representation of substrate surfaces comprising free hydroxyl groups 50 in accordance with various embodiments of the present teachings. Hydroxyl (OH) groups are randomly located on quartz and glass, typically about 5 groups and 2 groups per square nanometer, respectively. The outer circle of each free hydroxyl group 50 corresponds to the attachment zone for a single OH group with the understanding that the hydroxyl groups are not mobile. Tetra-hydrolyzable organo-metallic and/or silane and PFPE-tri-hydrolyzable organo-metallic and/or silane groups can be bonded onto the surface. As can be seen, the quartz surface provides a much greater population density of hydroxyl groups than does the glass surface, for example, 5 hydroxyl groups per square nanometer. The probability of PFPE diorgano-metallic and/or disilane molecules, that is, having two organo-metallic or silane groups, being bonded at both ends is unlikely above stoichiometric levels pairing surface hydroxyl groups with silane or organo-metallic groups. A condensed layer of tetra-hydrolyzable silane can convert the glass surface to a quartz-like surface, providing up to about 5 hydroxyl groups per square nanometer. The addition of other organo-metallic compounds to the surface can provide hydroxyl groups or other desirable properties.

Figure 2:
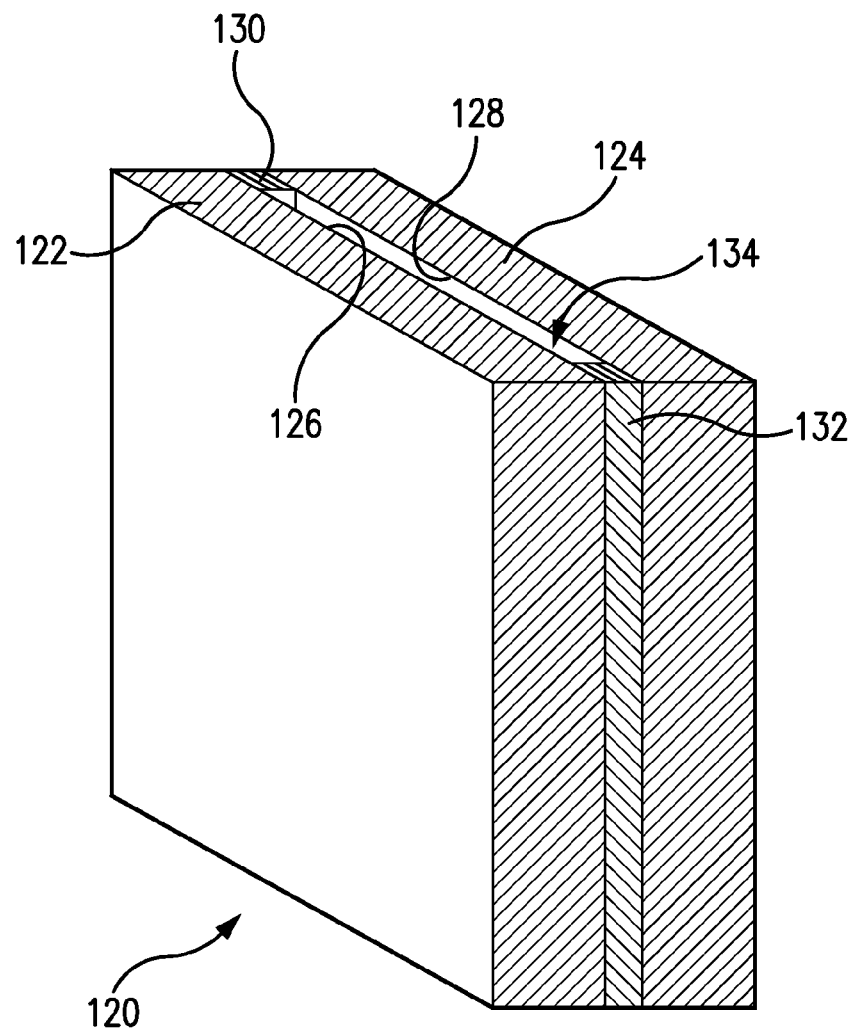
FIG. 2 is a perspective view of an assembly for manufacturing treated and coated substrate surfaces in accordance with various embodiments of the present teachings.

FIG. 2 is a perspective view of an assembly 120 for manufacturing treated and coated substrate surfaces in accordance with various embodiments of the present teachings. Assembly 120 can be constructed from a first substrate 122 and a second substrate 124. First substrate 122 can have a first inwardly facing surface 126. Second substrate 124 can have a second inwardly facing surface 128. First and second substrates 122, 124 can be separated from each other by a first spacer 130 and a second spacer 132. The region between the first and second inwardly facing surfaces 126, 128 can constitute a capillary volume 134 capable of holding one or more fluids. The fluid to be loaded into capillary volume 134 can comprise adhesive molecules capable of adhering to at least one of the first and second inwardly facing surfaces 126, 128.

Figure 3:
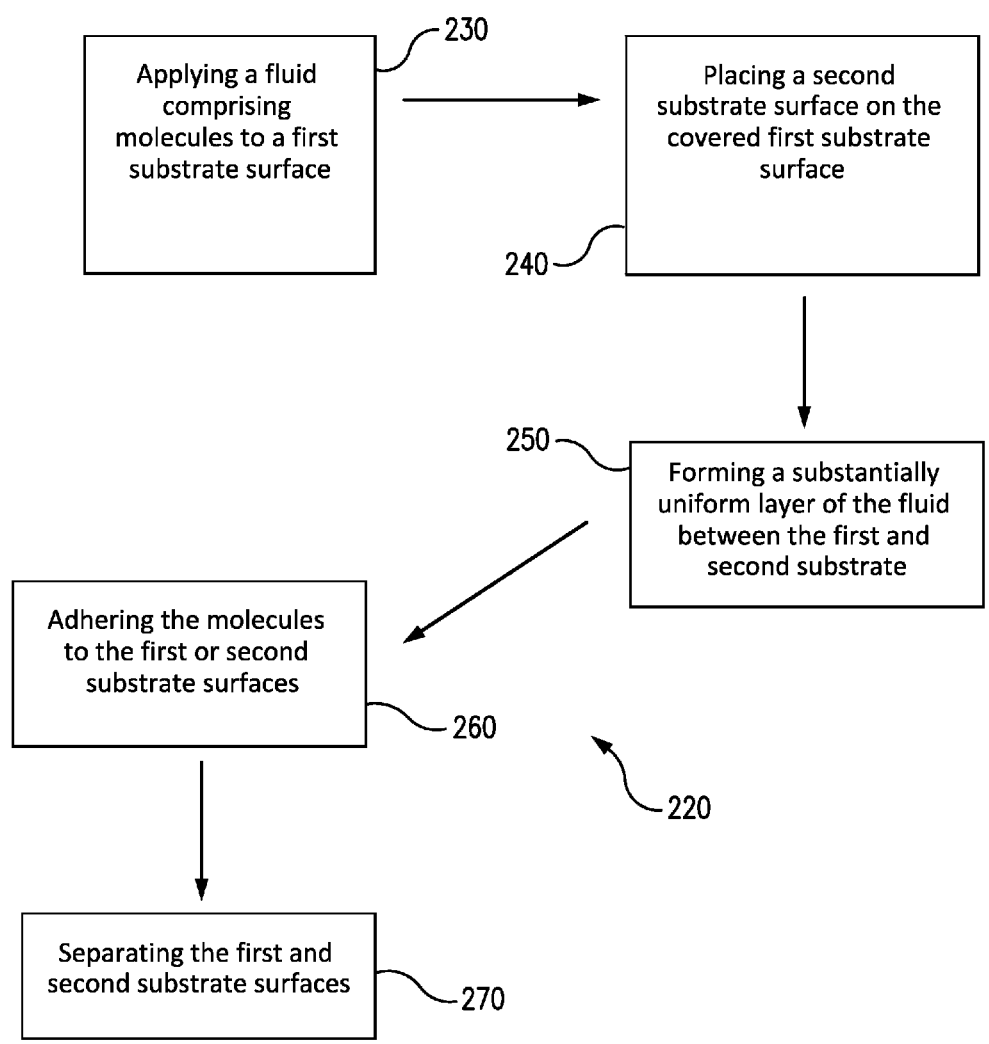
FIG. 3 is a flow chart illustrating a method of coating substrate surfaces in accordance with various embodiments of the present teachings.

FIG. 3 is a flow chart for a method 220 of coating substrate surfaces in accordance with various embodiments of the present teachings. In a step 230, a fluid can be applied to a first adhesive surface. The fluid can contain one or more kinds of molecules having adhesion groups. In step 240, a second adhesive substrate can be placed on the covered first adhesive surface. In a step 250, a substantially uniform layer of a fluid between the first and second substrate surfaces can be formed. The molecules can adhere to the first and second adhesive surfaces in step 260. In step 270, the first and second adhesive surfaces can be separated.

Figure 4:
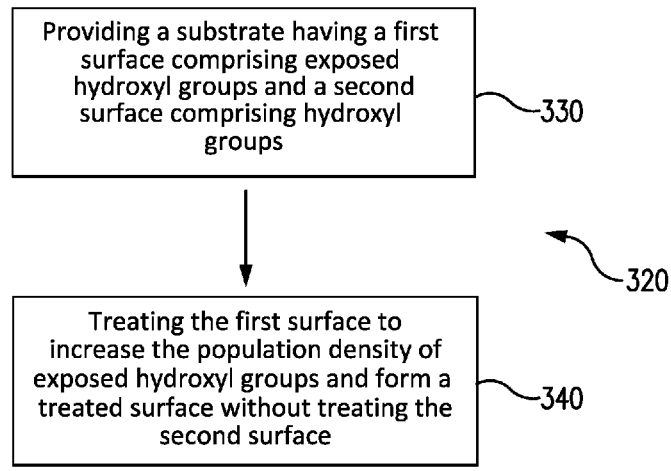
FIG. 4 is a flow chart illustrating a method of manufacturing a treated substrate in accordance with various embodiments of the present teachings.

FIG. 4 is a flow chart for a method 320 of manufacturing a treated substrate in accordance with various embodiments of the present teachings. In a step 330, a substrate is provided having a first surface comprising exposed hydroxyl groups, and a second surface comprising hydroxyl groups. The first surface can be treated in a step 340 to increase the population density of exposed hydroxyl groups and form a treated surface, without treating the second surface.

Figure 5:
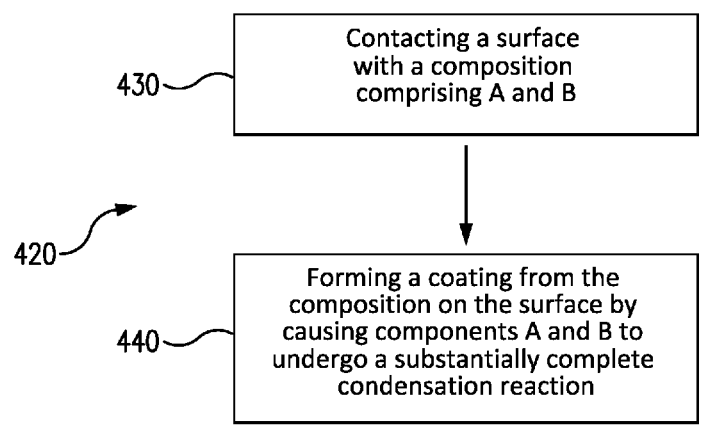
FIG. 5 is a flow chart illustrating a method of treating a substrate in accordance with various embodiments of the present teachings.

FIG. 5 is a flow chart for a method 420 of treating a substrate in accordance with various embodiments of the present teachings. In a step 430, a surface is contacted with a composition comprising component A and component B, wherein component A and component B are as described herein. A coating is formed on the surface from the composition in a step 440 by causing components A and B to undergo a substantially complete condensation reaction.

Figure 6:
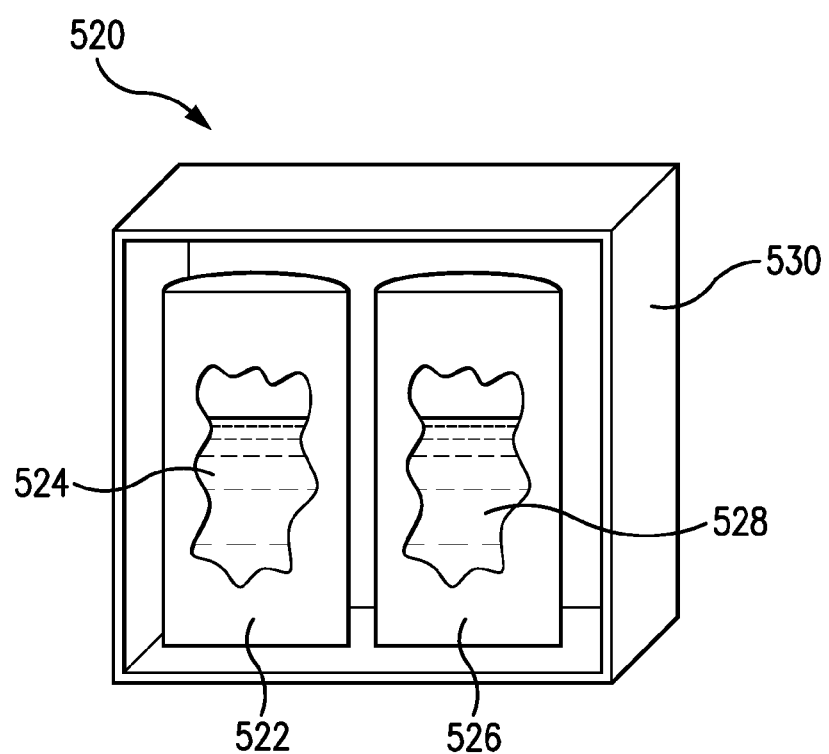
FIG. 6 is a partial cutaway view of a kit in accordance with various embodiments of the present teachings.

FIG. 6 is a cross-sectional, partial cutaway view of a kit 520 in accordance with various embodiments of the present teachings. Kit 520 can comprise a first container 522 containing first contents 524. First contents 524 can comprise component A as described herein. Kit 520 also comprises a second container 526 containing second contents 528. Second contents 528 can comprise component B as described above. First container 522 and second container 526 can each independently be a vial, a tube, a jar, an ampule, a box, a dish, or the like. First container 522 and second container 526 can be packaged together in a third container 530, for example, a box. The kit can further comprise instructions for use of first contents 524 and second contents 528 to coat a surface.

According to various embodiments of the present teachings, less, rather than more, of a coating is used to coat a substrate and form in a two-dimensional network. According to various embodiments of the present teachings, an exact amount of a coating component is used to coat an area of a substrate and form in a two-dimensional network. According to various embodiments of the present teachings, exact amounts of coating components are used to coat an area of a substrate and form in a layered three-dimensional network. Substrates that can be used include glass that has been immersed in a bath of molten minerals, for example salts, to exchange sodium ions for potassium ions, putting the surface under compression. In some embodiments, substrates that can be used include glass that has been heated above its Tg and then the surface cooled quickly, putting the surface under compression. In some embodiments, substrates that can be used include glass that has been strengthened or hardened by other means well known in the art. The subsequent coating treatment can be applied to one side of the resulting glass substrate but not the other. For an optimal polyorgano-metallic and/or silane coating treatment, the number of exposed hydroxyl groups can be substantially the same as the number of reactive groups intended to react with the surface. For an optimal mono-organo-metallic and/or silane coating treatment, the number of exposed hydroxyl groups can be less than the number of reactive groups intended to react with the surface, for example, about 4 to 5 times less, in other words, the number of reactive groups can be 4-5 times greater than the number of hydroxyl groups in order to form a continuous monolayer. Increasing the exposed hydroxyl group population density increases the adhesion of a network of organo-metallic and/or silanes. Increasing the exposed hydroxyl group population density can be particularly useful when a surface has been hardened, for example, heated above 500° C., which can reduce the density of available hydroxyl groups for long periods of time. Glass, generally, has a density of about 2.2 hydroxyl groups per square nanometer, high temperature treated glass often has a density of about 1.7 hydroxyl groups per square nanometer, and quartz generally has a density of about 5 hydroxyl groups per square nanometer.

In some embodiments, the substrate is a touch screen and the surface enhanced in exposed hydroxyl group population density is the side (surface) that will be coated and subsequently "touched" by a user. In various embodiments, the substrate is an appliance or display device, for example a 3D and/or electrowetting display device. The chemical coating can be applied to the touch surface using any means, for example, spraying, spinning, dipping, brushing, fogging, vacuum deposition, or the like. Tin oxide and circuitry, if present on the back surface, can remain unaffected during that process. Other circuitry such as piezoelectric sensors can also remain unaffected by the coating process on the touch surface. Glass is strong under compression and weak under tension, and when impacted, the touch surface is generally under compression while the back surface may become under tension. Hardened or strengthened glass surfaces are precompressed, such that impacts are less likely to put the back surface under tension, therefore it is beneficial to preserve compressive treatments to the back side of a touch surface. The population density of hydroxyl groups can generally be increased, for example, to about 2.0 per square nanometer, to about 2.5 per square nanometer, or greater. The process of increasing hydroxyl group concentration on the touch surface can start with unhardened glass or a glass substrate that is hardened on one or both sides. The process of increasing hydroxyl group concentration on a touch surface may remove compressive elements or compressed layers at the surface without disturbing compressive elements or compressed layers at the back surface. The treated side can become more quartz-like than glass-like, if the treated side is subsequently coated with silicate. In some embodiments, the composition used for treatment comprises 10% to 20% by weight ammonium hydroxide, 60% to 80% by weight water, and 10% to 20% by weight hydrogen peroxide, based on the total weight of the composition. In some embodiments, the composition used for treatment comprises 10% to 20% by weight sulfuric acid, 60% to 80% by weight water, and 10% to 20% by weight hydrogen peroxide, based on the total weight of the composition. The resulting hydroxyl group content of the treated surface can be determined using the techniques of X. M. Liu, J. L. Thomason, about F. R. Jones from the University of Sheffield and the University of Strathclyde. Any type of glass can be used, for example, GORILLA® Glass available from Corning, Inc. of Corning, N.Y. B270 glass available from Schott North America, Inc. of Elmsford, N.Y., can be used.

Difunctional organo-metallic and/or silanes, as well as other polyorgano-metallic and/or silanes, can be used in the surface-coating protocol and can be disposed on the surface at a level not to exceed the amount required to form a two dimensional networked monolayer of organo-metallic and/or silane groups on the surface. In some embodiments, it is preferred that the level of organo-metallic and/or silane groups disposed on the surface not exceed the amount required to bond with every hydroxyl group present on the surface, and thus not forming a networked monolayer. If used as a 0.02 to about 0.06% by weight of an about 4000 molecular weight difunctional organo-metallic and/or silane by total weight of a composition, a substrate can be dipped in the composition for about 30 seconds to about 5 minutes. In some embodiments, a disilane and/or diorgano-metallic can be used in the form of a $\frac{1}{10}$% to 4.0% by weight solution for spray and spin application of FLUOROSYL FSD4500, a perfluoropolyether with two ethoxysilane terminal groups, available from Cytonix LLC of Beltsville, Md. In some embodiments, an approximately 2000 molecular weight disilane may be used with adjustments in laydown according to the molecular weight, for example, Solvay FLUOROLINK® S10, a perfluoropolyether with two ethoxysilane terminal groups, available from Solvay Solexis, Inc. of West Deptford, N.J. The quantity of organo-metallic and/or silane to form a monolayer is approximately proportional to its molecular weights. Using a significant excess of organo-metallic and/or silanes can compromise abrasion resistance, oleophobicity, and hydrophobicity, as exposed organo-metallic and/or silane or hydrolyzed groups may be present at the exposed surface. Exposed hydroxyl groups at the surface contribute to wettability and friction. Instead, a relatively stoichiometric amount of organo-metallic and/or silane relative to the amount of hydroxyl groups and free surface area, is used. A PFPE disilane, a trisilane, a tetrasilane, and silane molecules with higher numbers of silane or organo-metallic groups can be used, as can PFPE molecules with still larger numbers of silane or organo-metallic groups. A polysilane or a different polyorgano-metallic molecule may have silane or organo-metallic groups located at one end of the molecule, at both ends of the molecule, or distributed in any way. In some embodiments, dipodal organo-metallic and/or silanes are preferred. Polysilanes and other polyorgano-metallics may have pendant groups that are organic, fluorinated, inorganic, functional, or combinations thereof. Upon application to the treated surface, the hydrolysable group, for example an alkoxy or a halogen group, can hydrolyze releasing an alcohol or halogen acid, which may come off in the air. SiOH then condenses and SiOSi is formed on the surface. In some cases the disilanes, FLUOROSYL FSD1500, FLUOROSYL FSD2500 or FLUOROSYL FSD4500, available from Cytonix LLC of Beltsville, Md., can be used. In some embodiments a tetrasilane may be used, such as FSQ3000 from Cytonix LLC of Beltsville, Md. For optimum hydrophobic and wear resistance, organo-metallics and/or silanes having a functionality of greater than one require that a relatively stoichiometric amount of organo-metallic and/or silane relative to the amount of hydroxyl groups and/or free surface area be used.

For a spray application of the polyorgano-metallic and/or silane compositions, there are at least three factors that can be considered. These three factors are rate of delivery, belt speed/pan rate, and concentration. In some embodiments of the present teachings, solvents with boiling points greater than 90° C. to greater than 150° C. may be used, and fluorinated oils may be used which are not volatile. The coated surface can be tested for water contact angle, water contact angle, roll-off (slip) angle, and abrasion resistance. Various surface analysis techniques can be used, for example, those described by Liu et al., slip angle testing, x-ray techniques, and laser techniques involving burning off a layer and testing by chromatography. An abrasion test can use materials such as but not limited to cotton, rubber, leather, sand paper, abrasives or steel wool rubbed repeatedly at a pressure of about 1 pound per square inch or higher against the treated surface. A contact angle of about 110° or greater for water is desirable. After, for example the steel wool application, the water contact angle should remain at least about 100°. According to various embodiments of the present teachings, touch screens are provided that exhibit a water contact angle of at or above 100° after 6000 rubs with 0000 steel wool at 1 pound per square inch pressure and 3000 rubs at 2.5 grams per square millimeter. In other tests measuring the retention of stains from liquids commonly found in homes and offices, it is desirable to have no visible retention.

Depending on the type of organo-metallics and/or silanes used, a cross-linker or bridging agent can be used to bring together isolated organo-metallic and/or silane molecules into two-dimension networks of interconnected organo-metallic and/or silanes bonded to the surface of the treated substrate by all available hydroxyl groups exposed on the substrate surface. Examples of cross-linkers and bridging agents include metals and metal oxides, organo-metallic compounds, tetraalkoxysilanes, dipodal organo-metallic and/or silanes, disilanes, tetrasilanes, or combinations thereof. In some embodiments of the present teachings, organo-metallic compounds may be used individually or in combination, which include those comprising vanadium, aluminum, titanium, zirconium, tin, and others well known in the art. In some embodiments, about 1% by weight to about 8% by weight tetraalkoxysilane may be used, based on the 4500 molecular weight of FLUOROSYL FSD 4500 molecules, a perfluoropolyether disilane available from Cytonix LLC of Beltsville, Md. It is preferred that there be a molar equivalent of water present equal to or greater than the molar weight of silol on the disilane and/or other silanes and other organo-metallic compounds which might be present. The concentration of organo-metallic and/or silane for applying in a formulation comprising a fluorosolvent or fluorochlorosolvent can be from about 0.001% to about 4% depending on the application process and conditions. Alcohol can be added with water, acids, tetraalkoxysilanes, alkoxyorgano-metallics, or other organic components to promote solubility in the fluorinated solvent. An acid or base may be used to catalyze the hydrolyzation step and promote silol formation. Anhydrides and other catalysts are known to promote silol formation. Examples of solvents that can be used include dichloropentafluoropropane (FREON 225), available from E.I. duPont deNemours (DuPont) of Wilmington, Del., ASAHIKLIN AK-225, available from Asahi Glass Co., Ltd. of Tokyo, Japan, and VERTREL® MCA, available from DuPont. In some embodiments, a solvent blend is used that includes a fluorinated solvent, 8.0% by weight alcohol and 0.5% by weight acid based on the total weight of the solvent blend. Examples of acids include 3.0% HCl by weight of the total weight of an acid solution, citric acid, and vinegar (acetic acid).

According to various embodiments of the present teachings, the silyl ethers of pendant perfluoropolyethers are particularly preferred. The coating composition can comprise a first reaction product of a vinyl ether functionalized pendent, as opposed to a linear, perfluoropolyether (PFPE), and a second reactant comprising a trichloro-silane, for example, a pendant perfluoropolyether trichlorosilane. In some embodiments the coating composition can comprise a reaction product of the first reaction product, for example, a second, subsequent reaction product of the first reaction product and a third reactant comprising at least one of trimethylortoformamate, triethylorthoformamate, tripropylorthoformamate, or a triarylorthoformamate.

Exemplary pendent PFPEs, second reactants, first reaction products, third reactants, fourth reactants, and second reaction products that can be used and formed include those shown in the reaction scheme below:

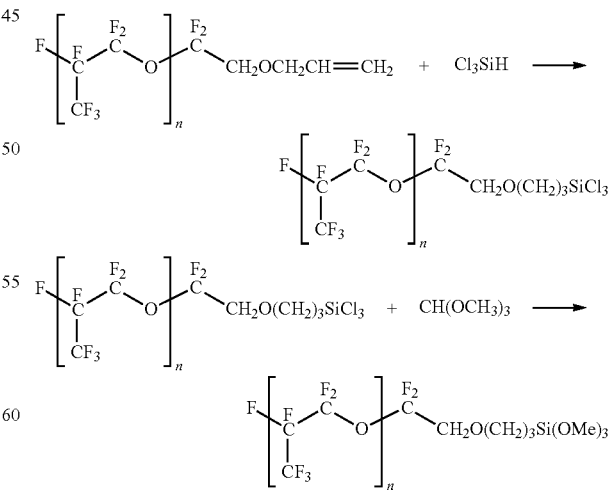

wherein n is from about 3 to about 30 or larger. In some embodiments, n in any of the formulae above can instead be from about 3 to about 25, from about 4 to about 20, from about 5 to about 20, or from about 10 to about 20. Methylorthoformamate, shown in the above example, can be substituted by any alkylorthoformamate or arylorthoformamate. Perfluoropolyether polysilanes, for example perfluoropolyether disilanes, can be formed according to the reaction scheme illustrated above, and other reaction schemes are known in the art for forming the first, second and polysilane reaction products. Methods that include carrying out the reactions according to one or more of these schemes are included in the present teachings. The present teachings also relate to methods that include coating substrates and forming such coating compositions on substrates. Exemplary pendant perfluoropolyethers that can be used in the first reaction scheme include KRY-TOX, a PFPE-K available from DuPont de Nemours, of Wilmington, Del., and Fomblin-Y, a PFPE-Y available from Solvay Solexis, Inc., West Deptford, N.J. In some embodiments, the second of these two reaction schemes is used but wherein the methoxy group ($OCH_3$) shown in the second reactant can instead be an alkoxy group, an aryloxy group, for example ethoxy or phenoxy, or a combination thereof. Exemplary precursors for forming di-functional perfluoropolyethers that can be used in the first reaction scheme to produce disilanes are FluoroLink D10, Fluorolink D10H, Fluorolink D, and FluoroLink D4000, and an exemplary precursor for forming a tetra-function perfluoropolyether that can be used in the first reaction scheme to produce a tetrasilane available from Solvay Solexis, Inc., West Deptford, N.J. Compositions of the present teachings can comprise a wide range of additives and co-agents, including but not limited to, nano-sized and micro-sized objects of all shapes and properties, such as particles, fibers, nano-tubes and other natural, manufactured and engineered components, said objects can have dimensions which are smaller than the wavelengths of visible, ultraviolet and infrared light or selected ranges therein. In some embodiments, one or more of said objects may comprise a volume which is greater or less than the total volume of the composition, substantially greater than the total volume, and may be present at or on the surface of coatings comprising the composition. In some embodiments, the composition may comprise non-volatile fluids, for example, fluorinated fluids, which can be present in the composition, dispersed in the composition, at the surface of the composition, or combinations thereof. In some embodiments, the composition can comprise solvents, such as a fluorinated and/or halogenated solvents, initiators, catalysts, resins, reactants having more than one reactive functionality, monomers, polymers, organic and inorganic substances. In some embodiments, the composition itself can be formed into articles, films, powders, and objects as described herein. In some embodiments, the surface of the composition can be formed to have a continuous or discontinuous, repeating or random topography, shape, relief, impression, texture, a roughness, pattern, design, feature, a height to width aspect ratio of a feature, a volume of a feature, or combinations thereof. In some embodiments, surfaces formed by or of the composition can be superhydrophobic, with contact angles to water that are greater than about 120 degrees to greater than about 170 degrees. In some embodiments, surfaces formed by or of the composition can be exceptionally resistant to adhesion by stains, marks, snow, ice, organic oils, common household and industrial substances, and pollutants. In some embodiments, surfaces formed by or of the composition can be exceptionally slippery, lubricious, and have an exceptionally low coefficient of friction. Touch screens can be coated with such coating compositions, and other articles, including those having various and substantially different properties and uses, can also benefit from such coatings, for example, smooth, rough, patterned, lithographed, micro and/or nano featured, superhydrophobic, textured, designed, printed, imprinted, porous, tubular, sintered, striated, reliefed, impressioned, hollowed, foamed edged, powdered, power-coated, etched, selectively-located, embossed, woven, non-woven, molded or formed surfaces, lotus-effect surfaces, electrowetting surfaces, laboratory vessels, fluidic devices, medical devices, powders, fibers, optical fibers, optical or electrical components, signal transmitters, signal receivers, signal reflectors, radomes, vehicular surfaces, architectural surfaces, outdoor furniture, household goods, kitchen articles, kitchen surfaces, bathroom articles, bathroom surfaces, antennae, microwave antennae, dishes, reflectors, signs, visual signaling devices, scanner windows, lenses, liquid crystal displays, electrowetting displays, 3D displays, and video displays.

In some embodiments, the composition comprises the reaction product obtained after a substantially complete condensation reaction of components A and B, wherein: component A comprises at least one of a pendent perfluoropolyether trichloro-silane shown in the first reaction, a pendent perfluoropolyether aryloxy-silane shown in the first reaction scheme below, scheme below, or a pendent perfluoropolyether alkoxysilane shown in the second reaction scheme below

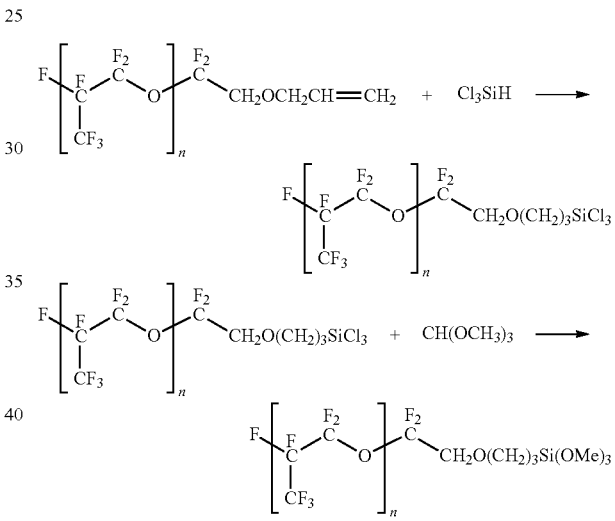

wherein n is from 3 to about 30; and component B comprises a tetraalkoxysilane in an amount of 8% by weight or less based on the total weight of components A and B combined together. Component B can be a tetraalkoxysilane present in an amount of from about 1% by weight to about 7% by weight, or from about 2% by weight to about 6% by weight based on the total weight of components A and B combined together. Component B can comprise organo-metallic compounds, metals, metal compounds, organic compounds, inorganic compounds, or any combination thereof, and Component B may be present in an amount greater than about 10% by weight of the total weight of components A and B. For example, Component B may be present in the applied coating at from about 1% by weight to about 99% by weight of the total weight of components A and B. In some embodiments Component A can be applied without Component B, or, in other embodiments, Component B may be applied a substantial period of time before the application of Component A. Component A can have a number average molecular weight of from about 500 to about 10,000, or from about 1,000 to about 5,000, or from about 2,000 to about 4,500. A coated substrate is also provided wherein the coating composition is coated on a surface of the substrate and the coating has a thickness of from about 2 nanometers (nm) to about 4 nm, from about 1 nm to about 5 nm, or of less than 2 nm. The coating can comprise a mono-molecular layer of the reaction product and the monomolecular layer can be continuous with the underlying substrate so as to constitute a monolithic surface comprising exposed fluorine compounds. In some embodiments, component B forms a continuous, substantially condensed layer on the underlying substrate that can be from about 1 monolayer in thickness (<1 nanometer) to about 100 nm or more, and component A forms a substantially homogeneous, condensed, continuous monolayer on component B so as to constitute a monolithic surface comprising exposed fluorine compounds. Component B can further comprise an organo-metallic component or other suitable component known in the art, such as an organo-metallic compound. In some embodiments throughout the present teaching, Component A may be applied by any means without the presence of a Component B to from a continuous, substantially condensed layer on the underlying substrate, where a fraction of the molecules of the composition are bound to the underlying substrate surface and to adjacent molecules, and the remaining fraction are bound only to adjacent molecules, functioning as cross-linking or bridging agents. Compositions of the present teachings can comprise a wide range of additives and co-agents, including but not limited to, nano-sized and micro-sized objects of all shapes and properties, such as particles, fibers, nano-tubes and other natural, manufactured and engineered components, said objects can have dimensions which are smaller than the wavelengths of visible, ultraviolet and infrared light or selected ranges therein. In some embodiments, one or more of said objects may comprise a volume which is greater or less than the total volume of the composition, substantially greater than the total volume, and may be present at or on the surface of coatings comprising the composition. In some embodiments, the composition can comprise non-volatile fluids, for example, fluorinated fluids, which can be present in the composition, dispersed in the composition, at the surface of the composition, or combinations thereof. In some embodiments, the composition can comprise solvents, such a fluorinated and/or halogenated solvents, initiators, catalysts, resins, reactants having more than one reactive functionality, monomers, polymers, organic and inorganic substances. In some embodiments, the composition itself can be formed into articles, films, powders, and objects as described herein. In some embodiments, the surface of the composition can be formed to have a continuous or discontinuous, repeating or random topography, shape, relief, impression, texture, a roughness, pattern, design, feature, a height to width aspect ratio of a feature, a volume of a feature, or combinations thereof. In some embodiments, surfaces formed by or of the composition can be superhydrophobic, with contact angles to water that are greater than about 120 degrees to greater than about 170 degrees. In some embodiments, surfaces formed by or of the composition can be exceptionally resistant to adhesion by stains, marks, snow, ice, organic oils, common household and industrial substances, and pollutants. In some embodiments, surfaces formed by or of the composition can be exceptionally slippery, lubricious, and have an exceptionally low coefficient of friction. In some cases a touch screen device is provided comprising a touch screen and a coating on the touch screen, wherein the coating comprises the composition. In some cases a 3D imaging device is provided comprising a screen and a coating on the screen, wherein the coating comprises the composition. In some cases an electrowetting display device is provided comprising a screen and a coating on the screen. In some cases a touch screen, a 3D imaging device, and an electrowetting display device may be present in a display device. More generally, any article can be coated with the composition, for example, smooth, rough, patterned, lithographed, micro and/or nano featured, superhydrophobic, textured, designed, printed, imprinted, porous, tubular, sintered, striated, reliefed, impressioned, hollowed, foamed, edged, powdered, powder-coated, etched, selectively-located, embossed, woven, non-woven, molded or formed surfaces, lotus-effect surfaces, electrowetting surfaces, laboratory vessels, fluidic devices, medical devices, powders, fibers, optical fibers, optical or electrical components, signal transmitters, signal receivers, signal reflectors, radomes, vehicular surfaces, architectural surfaces, outdoor furniture, household goods, kitchen articles, kitchen surfaces, bathroom articles, bathroom surfaces, antennae, microwave antennae, dishes, reflectors, signs, visual signaling devices, scanner windows, lenses, liquid crystal displays, electrowetting displays, 3D displays, and video displays. In addition, the present invention relates to processes of coating small article surfaces, for example, smart phone touch screens, tablet computer screens, and the like, with nominal solvent loss.

In yet other embodiments of the present teachings, a composition is provided that comprises at least one pendent perfluoropolyether trichloro-silane of the formula

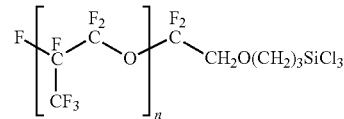

wherein n is from 3 to about 30. The pendent perfluoropolyether can comprise, for example, a PFPE-K or a PFPE-Y. The composition can further comprise a solvent comprising a fluorinated solvent. Compositions of the present teachings can comprise a wide range of additives and co-agents, including but not limited to, nano-sized and micro-sized objects of all shapes and properties, such as particles, fibers, nano-tubes and other natural, manufactured and engineered components, said objects can have dimensions which are smaller than the wavelengths of visible, ultraviolet and infrared light or selected ranges therein. In some embodiments, one or more of said objects may comprise a volume which is greater or less than the total volume of the composition, substantially greater than the total volume, and may be present at or on the surface of coatings comprising the composition. In some embodiments, the composition can comprise non-volatile fluids, for example, fluorinated fluids, which can be present in the composition, dispersed in the composition, at the surface of the composition, or combinations thereof. In some embodiments, the composition can comprise solvents, such a fluorinated and/or halogenated solvents, initiators, catalysts, resins, reactants having more than one reactive functionality, monomers, polymers, organic and inorganic substances. In some embodiments, the composition itself can be formed into articles, films, powders, and objects as described herein. In some embodiments, the surface of the composition can be formed to have a continuous or discontinuous, repeating or random topography, shape, relief, impression, texture, a roughness, pattern, design, feature, a height to width aspect ratio of a feature, a volume of a feature, or combinations thereof. In some embodiments, surfaces formed by or of the composition can be superhydrophobic, with contact angles to water that are greater than about 120 degrees to greater than about 170 degrees. In some embodiments, surfaces formed by or of the composition can be exceptionally resistant to adhesion by stains, marks, snow, ice, organic oils, common household and industrial substances, and pollutants. In some embodiments, surfaces formed by or of the composition can be exceptionally slippery, lubricious, and have an exceptionally low coefficient of friction. In some cases a touch screen device is provided comprising a touch screen and a coating on the touch screen, wherein the coating comprises the composition. In some cases a 3D imaging device is provided comprising a screen and a coating on the screen, wherein the coating comprises the composition. In some cases an electrowetting display device is provided comprising a screen and a coating on the screen. More generally, any article can be coated with the composition, for example, smooth, rough, patterned, lithographed, micro and/or nano featured, superhydrophobic, textured, designed, printed, imprinted, porous, tubular, sintered, striated, reliefed, impressioned, hollowed, foamed, edged, powdered, power-coated, etched, selectively-located, embossed, woven, non-woven, molded or formed surfaces, lotus-effect surfaces, electrowetting surfaces, laboratory vessels, fluidic devices, medical devices, powders, fibers, optical fibers, optical or electrical components, signal transmitters, signal receivers, signal reflectors, radomes, vehicular surfaces, architectural surfaces, outdoor furniture, household goods, kitchen articles, kitchen surfaces, bathroom articles, bathroom surfaces, antennae, microwave antennae, dishes, reflectors, signs, visual signaling devices, scanner windows, lenses, liquid crystal displays, electrowetting displays, 3D displays, and video displays.

In some embodiments a composition is provided that comprises at least one pendent perfluoropolyether alkoxysilane of the formula

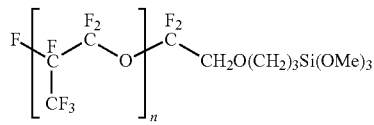

wherein n is from 3 to about 30. The pendent perfluoropolyether can comprise, for example, a PFPE-K or a PFPE-Y. The composition can further comprise a solvent comprising a fluorinated solvent. Compositions of the present teachings can comprise a wide range of additives and co-agents, including but not limited to, nano-sized and micro-sized objects of all shapes and properties, such as particles, fibers, nano-tubes and other natural, manufactured and engineered components, said objects can have dimensions which are smaller than the wavelengths of visible, ultraviolet and infrared light or selected ranges therein. In some embodiments, one or more of said objects may comprise a volume which is greater or less than the total volume of the composition, substantially greater than the total volume, and may be present at or on the surface of coatings comprising the composition. In some embodiments, the composition can comprise non-volatile fluids, for example, fluorinated fluids, which can be present in the composition, dispersed in the composition, at the surface of the composition, or combinations thereof. In some embodiments, the composition can comprise solvents, such a fluorinated and/or halogenated solvents, initiators, catalysts, resins, reactants having more than one reactive functionality, monomers, polymers, organic and inorganic substances. In some embodiments, the composition itself can be formed into articles, films, powders, and objects as described herein. In some embodiments, the surface of the composition can be formed to have a continuous or discontinuous, repeating or random topography, shape, relief, impression, texture, a roughness, pattern, design, feature, a height to width aspect ratio of a feature, a volume of a feature, or combinations thereof. In some embodiments, surfaces formed by or of the composition can be superhydrophobic, with contact angles to water that are greater than about 120 degrees to greater than about 170 degrees. In some embodiments, surfaces formed by or of the composition can be exceptionally resistant to adhesion by stains, marks, snow, ice, organic oils, common household and industrial substances, and pollutants. In some embodiments, surfaces formed by or of the composition can be exceptionally slippery, lubricious, and have an exceptionally low coefficient of friction. In some cases a touch screen device is provided comprising a touch screen and a coating on the touch screen, wherein the coating comprises the composition. In some cases a 3D imaging device is provided comprising a screen and a coating on the screen, wherein the coating comprises the composition. In some cases an electrowetting display device is provided comprising a screen and a coating on the screen. More generally, any article can be coated with the composition, for example, smooth, rough, patterned, lithographed, micro and/or nano featured, superhydrophobic, textured, designed, printed, imprinted, porous, tubular, sintered, striated, reliefed, impressioned, hollowed, foamed edged, powdered, power-coated, etched, selectively-located, embossed, woven, non-woven, molded or formed surfaces, lotus-effect surfaces, electrowetting surfaces, laboratory vessels, fluidic devices, medical devices, powders, fibers, optical fibers, optical or electrical components, signal transmitters, signal receivers, signal reflectors, radomes, vehicular surfaces, architectural surfaces, outdoor furniture, household goods, kitchen articles, kitchen surfaces, bathroom articles, bathroom surfaces, antennae, microwave antennae, dishes, reflectors, signs, visual signaling devices, scanner windows, lenses, liquid crystal displays, electrowetting displays, 3D displays, and video displays.

All publications, patents, and patent applications mentioned in this specification are herein incorporated by reference to the same extent as if each individual publication, patent, or patent application was specifically and individually indicated to be incorporated by reference.

While embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. The alternative embodiments disclosed in various paragraphs and sections of the disclosure should be construed to apply, where appropriate, in all paragraphs and sections of the disclosure. It is intended that the following claims define the scope of the disclosure and that methods and structures within the scope of these claims and their equivalents be covered thereby.

What is claimed is:

1. A perfluoropolyether silane composition consisting of a perfluoropolyether silane and a non-volatile fluorinated oil, the perfluoropolyether silane having the formula:

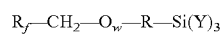

wherein $R_f$ represents a K type perfluoropolyether or a Y type perfluoropolyether, Y represents a hydrolysable group independently selected from a chloro group, an alkoxy group, an acyloxy group, and an aryloxy group, R represents an alkyl group of 1 to 4 carbon atoms, and w is 0 or 1.

2. The perfluoropolyether silane composition of claim 1, wherein w is 1, R is an alkyl group of 3 carbon atoms, and each Y is a methoxy group.

3. The perfluoropolyether silane composition of claim 1, having the formula:

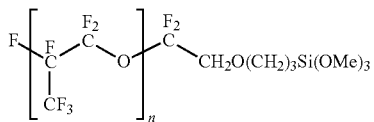

wherein n is from 3 to about 30.

4. The perfluoropolyether silane composition of claim 1, wherein the pendant perfluoropolyether has a molecular weight of from about 500 to about 10,000 amu.

5. The perfluoropolyether silane composition of claim 1, wherein the pendant perfluoropolyether has a molecular weight of from about 2000 to about 5000 amu.

6. The perfluoropolyether silane composition of claim 1, wherein the hydrolysable group is selected from the group consisting of a chloro group, a methoxy group, and an ethoxy group.

7. An article comprising a smooth surface that is coated, at least in part, by the perfluoropolyether silane composition of claim 1.

8. A perfluoropolyether silane composition consisting of a perfluoropolyether silane and a non-volatile fluorinated oil, the perfluoropolyether silane having the formula:

$R_f\text{—}CH_2\text{—}R\text{—}Si(Y)_3$ wherein $R_f$ represents a K type perfluoropolyether or a Y type perfluoropolyether, Y represents a hydrolysable group independently selected from a chloro group, an alkoxy group, an acyloxy group, and an aryloxy group, and R represents an alkyl group of 1 to 4 carbon atoms.

9. An article comprising a rough surface that is coated, at least in part, by the perfluoropolyether silane composition of claim 1, wherein the rough surface has a repeating or random topography, a relief, an impression, a texture, a pattern, a design, a feature, or a combination thereof.

10. An article comprising a touch screen that is coated, at least in part, by the perfluoropolyether silane composition of claim 1.

11. An article comprising a 3D imaging screen that is coated, at least in part, by the perfluoropolyether silane composition of claim 1.

12. An article comprising an electrowetting display screen that is coated, at least in part, by the perfluoropolyether silane composition of claim 1.

13. A perfluoropolyether silane composition consisting of a perfluoropolyether silane and a non-volatile fluorinated oil, the perfluoropolyether silane having the formula:

$R_f\text{—}CH_2\text{—}O\text{—}R\text{—}Si(Y)_3$ wherein $R_f$ represents a K type perfluoropolyether or a Y type perfluoropolyether, Y represents a hydrolysable group independently selected from a chloro group, an alkoxy group, an acyloxy group, and an aryloxy group, and R represents an alkyl group of 1 to 4 carbon atoms.

14. The perfluoropolyether silane composition of claim 13, wherein the pendant perfluoropolyether has a molecular weight of from about 500 to about 10,000 amu.

15. The perfluoropolyether silane composition of claim 13, wherein the pendant perfluoropolyether has a molecular weight of from about 2000 and about 5000 amu.

16. The perfluoropolyether silane composition of claim 13, wherein the hydrolysable group is selected from the group consisting of a chloro group, a methoxy group, and an ethoxy group.

17. A composition comprising the perfluoropolyether silane composition of claim 13 and one or more additives selected from the group consisting of a tetraalkoxy silane, a polysilane, a polyorganometallic compound, a dipodal silane, and a dipodal organometallic compound.

18. A composition comprising the perfluoropolyether silane composition of claim 13 and a fluorinated solvent.

19. The perfluoropolyether silane composition of claim 13, wherein the perfluoropolyether silane comprises the reaction product of a pendant perfluoropolyether vinyl ether and $Cl_3SiH$.

20. The perfluoropolyether silane composition of claim 13, wherein the perfluoropolyether silane comprises the reaction product of a pendant perfluoropolyether trichlorosilane and one or more alcohols selected from methanol, ethanol, and propanol.

21. An article comprising a rough surface that is coated, at least in part, by the perfluoropolyether silane composition of claim 13, wherein the rough surface has a repeating or random topography, a relief, an impression, a texture, a pattern, a design, a feature, or a combination thereof.

22. An article comprising a touch screen that is coated, at least in part, by the perfluoropolyether silane composition of claim 13.

23. An article comprising a 3D imaging screen that is coated, at least in part, by the perfluoropolyether silane composition of claim 13.

24. An article comprising an electrowetting display screen that is coated, at least in part, by the perfluoropolyether silane composition of claim 13.

* * * * *